(12) United States Patent
Rajpal et al.

(10) Patent No.: US 11,988,749 B2
(45) Date of Patent: May 21, 2024

(54) SYSTEM AND METHOD FOR HYBRID LiDAR SEGMENTATION WITH OUTLIER DETECTION

(71) Applicant: Argo AI, LLC, Pittsburgh, PA (US)

(72) Inventors: Satyen Rajpal, Pittsburgh, PA (US); Jason Paul Ziglar, Pittsburgh, PA (US)

(73) Assignee: Argo AI, LLC, Pittsburgh, PA (US)

(*) Notice: Subject to any disclaimer, the term of this patent is extended or adjusted under 35 U.S.C. 154(b) by 468 days.

(21) Appl. No.: 17/406,682

(22) Filed: Aug. 19, 2021

(65) Prior Publication Data

US 2023/0054440 A1 Feb. 23, 2023

(51) Int. Cl.
| | | |
|---|---|---|
| *G01S 17/89* | (2020.01) | |
| *B60W 50/06* | (2006.01) | |
| *B60W 60/00* | (2020.01) | |
| *G01S 7/481* | (2006.01) | |
| *G01S 17/931* | (2020.01) | |

(Continued)

(52) U.S. Cl.
CPC ............ *G01S 17/89* (2013.01); *B60W 50/06* (2013.01); *B60W 60/001* (2020.02); *G01S 7/4815* (2013.01); *G01S 17/931* (2020.01); *G06F 18/2148* (2023.01); *G06F 18/2193* (2023.01); *G06F 18/23* (2023.01); *G06N 3/08* (2013.01); *G06T 7/11* (2017.01); *G06V 20/58* (2022.01);
(Continued)

(58) Field of Classification Search
CPC ...... G01S 17/89; G01S 7/4815; G01S 17/931; B60W 50/06; B60W 60/001; B60W 2420/408; B60W 2420/52; G06F 18/2148; G06F 18/2193; G06F 18/23; G06F 18/214; G06N 3/08; G06N 3/045; G06N 5/01; G06N 7/01; G06N 20/20; G06T 7/11; G06T 2207/10028; G06T 2207/20084; G06T 2207/20081; G06V 20/58; G06V 10/26; G06V 10/82
See application file for complete search history.

(56) References Cited

U.S. PATENT DOCUMENTS

2019/0147610 A1 5/2019 Frossard et al.
2020/0004259 A1* 1/2020 Gulino ................. G05D 1/024

FOREIGN PATENT DOCUMENTS

WO 2020205655 A1 10/2020
WO 2021007561 A1 1/2021

OTHER PUBLICATIONS

Capellier et al., Evidential deep learning for arbitrary LIDAR object classification in the context of autonomous driving, 2019 IEEE Intelligent Vehicles Symposium (IV), Paris, France. Jun. 9-12, 2019, pp. 1304-1311 (Year: 2019).*

(Continued)

*Primary Examiner* — Vu Le
*Assistant Examiner* — Lei Zhao
(74) *Attorney, Agent, or Firm* — The Webb Law Firm

(57) ABSTRACT

Devices, methods, and systems may obtain at least one point cloud, segment points in the at least one point cloud into a plurality of segments, train a neural network using known segments and a first loss function to generate a first trained neural network, train the first trained neural network using outlier segments and a second loss function to generate a second trained neural network, and train an extended isolation forest by applying an extended isolation algorithm to features of the known segments and features of the outlier segments to generate an anomaly score for each segment.

20 Claims, 10 Drawing Sheets

(51) Int. Cl.
　　　G06F 18/21　　(2023.01)
　　　G06F 18/214　(2023.01)
　　　G06F 18/23　　(2023.01)
　　　G06N 3/08　　 (2023.01)
　　　G06T 7/11　　 (2017.01)
　　　G06V 20/58　　(2022.01)

(52) U.S. Cl.
　　　CPC ............. B60W 2420/408 (2024.01); G06T 2207/10028 (2013.01); G06T 2207/20084 (2013.01)

(56) References Cited

OTHER PUBLICATIONS

Patel et al., Investigation of Uncertainty of Deep Learning-based Object Classification on Radar Spectra, 2021 IEEE Radar Conference, Jun. 1, 2021 (Year: 2021).*
Zhang et al., mixup: Beyond Empirical Risk Minimization, ICLR 2018, Apr. 27, 2018 (Year: 2018).*
Hariri et al., Extended Isolation Forest, IEEE Transactions on Knowledge and Data Engineering, vol. 33, Issue: 4, pp. 1479-1489 (Year: 2020).*
Behley et al., "A Benchmark for LiDAR-based Panoptic Segmentation based on KITTI," Mar. 2020.
Brabandere et al., "Semantic Instance Segmentation with a Discriminative Loss Function," Aug. 2017.
Chalapathy et al., "Deep Learning for Anomaly Detection: A Survey," Jan. 2019.
Felzenszwalb et al., "Image Segmentation Using Local Variation," Jun. 1998.
Fu et al., "Camera-based Semantic Enhanced Vehicle Segmentation for Planar LIDAR, " Nov. 2018.
Han et al., "OccuSeg: Occupany-aware 3D Instance Segmentation," Apr. 2020.
Hariri et al., "Extended Isolation Forest," Jul. 2020.
Li et al., "Deep Learning for LiDAR Point Clouds in Autonomous Driving: A Review," May 2020.
Liu et al., "Isolation Forest," Dec. 2008.
Qi et al., "PointNet: Deep Learning on Point Sets for 3D Classification and Segmentation," Apr. 2017.
Wang et al., "An Improved DBSCAN Method for LiDAR Data Segmentation with Automatic Eps Estimation," Jan. 2019.
Wong et al., "Identifying Unknown Instances for Autonomous Driving," Oct. 2019.
Zhang et al., "Instance Segmentation of LiDAR Point Clouds," May 2020.

* cited by examiner

SYSTEM AND METHOD FOR HYBRID LiDAR SEGMENTATION WITH OUTLIER DETECTION

BACKGROUND

1. Field

This disclosure relates generally to image segmentation and, in some non-limiting embodiments or aspects, to a hybrid of closed world and open world approaches to LiDAR segmentation with outlier detection.

2. Technical Considerations

One goal in autonomous driving is to segment real world objects represented in point clouds. Existing methods, such as disclosed by Behley et al. in the paper titled "A Benchmark for LiDAR-based Panoptic Segmentation based on KITTI", 2020, arXiv:2003.02371, attempt to solve this problem with a closed world approach by training on a dataset. However, such closed world approaches are not able to deal with data that the model has not seen before in the training process, which raises a significant safety concern. In order to safely operate, an autonomous vehicle should be able to identify objects that the autonomous vehicle has not seen before so that the autonomous vehicle knows how to properly interact with the objects. For example, if an object is on a roadway and in a path of the autonomous vehicle, the autonomous vehicle should not touch the object.

Other existing methods, such as disclosed by Wang et al. in the paper titled "An Improved DBSCAN Method for LiDAR Data Segmentation with Automatic Eps Estimation", 2019, 10.3390/s19010172, attempt to solve this problem with a complete open world approach. All possible clusters of points are identified, but such open world approaches do not give a semantic meaning to the identified clusters, which may result in an autonomous vehicle reacting differently to a cluster of points representing a car versus a cluster of points representing a pedestrian.

SUMMARY

Accordingly, provided are improved systems, methods, products, apparatuses, and/or devices for LiDAR segmentation.

Non-limiting embodiments or aspects are set forth in the following numbered clauses:

Clause 1. A computer-implemented method, comprising: obtaining, with at least one processor, at least one point cloud; segmenting, with the at least one processor, points in the at least one point cloud into a plurality of segments; training, with the at least one processor, a neural network by: providing, as input to the neural network, the plurality of segments; receiving, as output from the neural network, for each segment, one or more first output features associated with one of (i) that segment being a known segment clustered in a known cluster of a plurality of known clusters and (ii) that segment being an outlier segment located in an outlier space located outside each known cluster of the plurality of known clusters; and modifying one or more parameters of the neural network according to a first loss function that depends on the one or more first output features associated with each known segment to generate a first trained neural network; training, with the at least one processor, the first trained neural network by: providing, as input to the first trained neural network, each outlier segment; receiving, as output from the first trained neural network, for each outlier segment, one or more second output features associated with that outlier segment; and modifying one or more parameters of the first trained neural network according to a second loss function different than the first loss function to generate a second trained neural network, wherein the second loss function depends on the one or more second output features associated with each outlier segment; and training, with the at least one processor, an extended isolation forest by applying an extended isolation algorithm to (i) the one or more second output features associated with each outlier segment and (ii) the one or more first output features associated with each known segment, wherein the extended isolation forest generates, for each segment of the plurality of segments, an anomaly score.

Clause 2. The computer-implemented method of clause 1, further comprising using, by the at least one processor, a conditional random field (CRF) to segment the points in the at least one point cloud into the plurality of segments.

Clause 3. The computer-implemented method of any of clauses 1 and 2, wherein the neural network includes a multilayer perceptron (MLP) network.

Clause 4. The computer-implemented method of any of clauses 1-3, wherein the second loss function is defined according to the following Equation:

$$L_{outlier} = \frac{1}{N_o \times C} \sum_{o \in O} \sum_{c \in C} [\delta_o - \|f_o - u_c\|]_+^2$$

where $N_o$ is a number of the outlier segments, C is a number of the plurality of clusters, $\delta_o$ is a hinge distance, $f_o$ is the one or more second output features associated the outlier segment, and $u_c$ is a mean embedding for a cluster c.

Clause 5. The computer-implemented method of any of clauses 1-4, further comprising: providing, with the at least one processor, the second trained neural network and the extended isolation forest; obtaining, with the at least one processor, at least one further point cloud; segmenting, with the at least one processor, further points in the at least one further point cloud into one or more further segments; processing, with the at least one processor, using the second trained neural network, the one or more further segments to generate one or more further output features associated with the one or more further segments; and processing, with the at least one processor, using the extended isolation forest, the one or more further features to generate one or more further anomaly scores for the one or more further segments.

Clause 6. The computer-implemented method of any of clauses 1-5, further comprising: controlling, with the at least one processor, based on the one or more further features and the one or more further anomaly scores for the one or more further segments, at least one autonomous driving operation of an autonomous vehicle.

Clause 7. The computer-implemented method of any of clauses 1-6, wherein the at least one point cloud is associated with a plurality of laser emitters of a LiDAR system.

Clause 8. A computer program product comprising at least one non-transitory computer-readable medium including program instructions that, when executed by at least one processor, cause the at least one processor to: obtain at least one point cloud; segment points in the at least one point cloud into a plurality of segments; train a neural network by: providing, as input to the neural network, the plurality of segments; receiving, as output from the neural network, for each segment, one or more first output features associated with one of (i) that segment being a known segment clustered in a known cluster of a plurality of known clusters and (ii) that segment being an outlier segment located in an outlier space located outside each known cluster of the plurality of known clusters; and modifying one or more parameters of the neural network according to a first loss function that depends on the one or more first output features associated with each known segment to generate a first trained neural network; train the first trained neural network by: providing, as input to the first trained neural network, each outlier segment; receiving, as output from the first trained neural network, for each outlier segment, one or more second output features associated with that outlier segment; and modifying one or more parameters of the first trained neural network according to a second loss function different than the first loss function to generate a second trained neural network, wherein the second loss function depends on the one or more second output features associated with each outlier segment; and train an extended isolation forest by applying an extended isolation algorithm to (i) the one or more second output features associated with each outlier segment and (ii) the one or more first output features associated with each known segment, wherein the extended isolation forest generates, for each segment of the plurality of segments, an anomaly score.

Clause 9. The computer program product of clause 8, wherein the at least one processor uses a conditional random field (CRF) to segment the points in the at least one point cloud into the plurality of segments.

Clause 10. The computer program product of any of clauses 8 and 9, wherein the neural network includes a multilayer perceptron (MLP) network.

Clause 11. The computer program product of any of clauses 8-10, wherein the second loss function is defined according to the following Equation:

$$L_{outlier} = \frac{1}{N_o \times C} \sum_{o \in O} \sum_{c \in C} [\delta_o - \|f_o - u_c\|]_+^2$$

where $N_o$ is a number of the outlier segments, C is a number of the plurality of clusters, $\delta_o$ is a hinge distance, $f_o$ is the one or more second output features associated the outlier segment, and $u_c$ is a mean embedding for a cluster c.

Clause 12. The computer program product of any of clauses 8-11, wherein the at least one processor is further configured to: provide the second trained neural network and the extended isolation forest; obtain at least one further point cloud; segment further points in the at least one further point cloud into one or more further segments; process, using the second trained neural network, the one or more further segments to generate one or more further output features associated with the one or more further segments; and process, using the extended isolation forest, the one or more further features to generate one or more further anomaly scores for the one or more further segments.

Clause 13. The computer program product of any of clauses 8-12, wherein the at least one processor is further configured to control, based on the one or more further features and the one or more further anomaly scores for the one or more further segments, at least one autonomous driving operation of an autonomous vehicle.

Clause 14. The computer program product of any of clauses 8-13, wherein the at least one point cloud is associated with a plurality of laser emitters of a LiDAR system.

Clause 15. A system, comprising: one or more sensors configured to capture one or more point clouds associated with an environment surrounding an autonomous vehicle; at least one processor configured to: store a segmentation neural network trained by: providing, as input to a neural network, a plurality of segments segmented from at least one point cloud; receiving, as output from the neural network, for each segment, one or more first output features associated with one of (i) that segment being a known segment clustered in a known cluster of a plurality of known clusters and (ii) that segment being an outlier segment located in an outlier cluster located outside each known cluster of the plurality of known clusters; and modifying one or more parameters of the neural network according to a first loss function that depends on the one or more first output features associated with each known segment to generate a first trained neural network; providing, as input to the first trained neural network, each outlier segment; receiving, as output from the first trained neural network, for each outlier segment, one or more second output features associated with that outlier segment; and modifying one or more parameters of the first trained neural network according to a second loss function different than the first loss function to generate the segmentation neural network, wherein the second loss function depends on the one or more second output features associated with each outlier segment; store an extended isolation forest trained by: applying an extended isolation algorithm to (i) the one or more second output features associated with each outlier segment and (ii) the one or more first output features associated with each known segment, wherein the extended isolation forest generates, for each segment of the plurality of segments, an anomaly score; segment further points in the one or more point clouds into one or more further segments; process, using the segmentation neural network, the one or more further segments to generate one or more further output features associated with the one or more further segments; and process, using the extended isolation forest, the one or more further features to generate one or more further anomaly scores for the one or more further segments.

Clause 16. The system of clause 15, wherein the at least one processor is further configured to use a conditional random field (CRF) to segment the further points in the one or more point clouds into the one or more further segments.

Clause 17. The system of any of clauses 15 and 16, wherein the segmentation neural network includes a multilayer perceptron (MLP) network.

Clause 18. The system of any of clauses 15-17, wherein the second loss function is defined according to the following Equation:

$$L_{outlier} = \frac{1}{N_o \times C} \sum_{o \in O} \sum_{c \in C} [\delta_o - \|f_o - u_c\|]_+^2$$

where $N_o$ is a number of the outlier segments, C is a number of the plurality of clusters, $\delta_o$ is a hinge distance, $f_o$ is the one or more second output features associated the outlier segment, and $u_c$ is a mean embedding for a cluster c.

Clause 19. The system of any of clauses 15-18, wherein the at least one processor is further configured to control, based on the one or more further features and the one or more further anomaly scores for the one or more further segments, at least one autonomous driving operation of the autonomous vehicle.

Clause 20. The system of any of clauses 15-19, wherein the one or more sensors include a LiDAR system.

BRIEF DESCRIPTION OF THE DRAWINGS

Additional advantages and details are explained in greater detail below with reference to the exemplary embodiments that are illustrated in the accompanying schematic figures, in which.

DESCRIPTION

Figure 1:
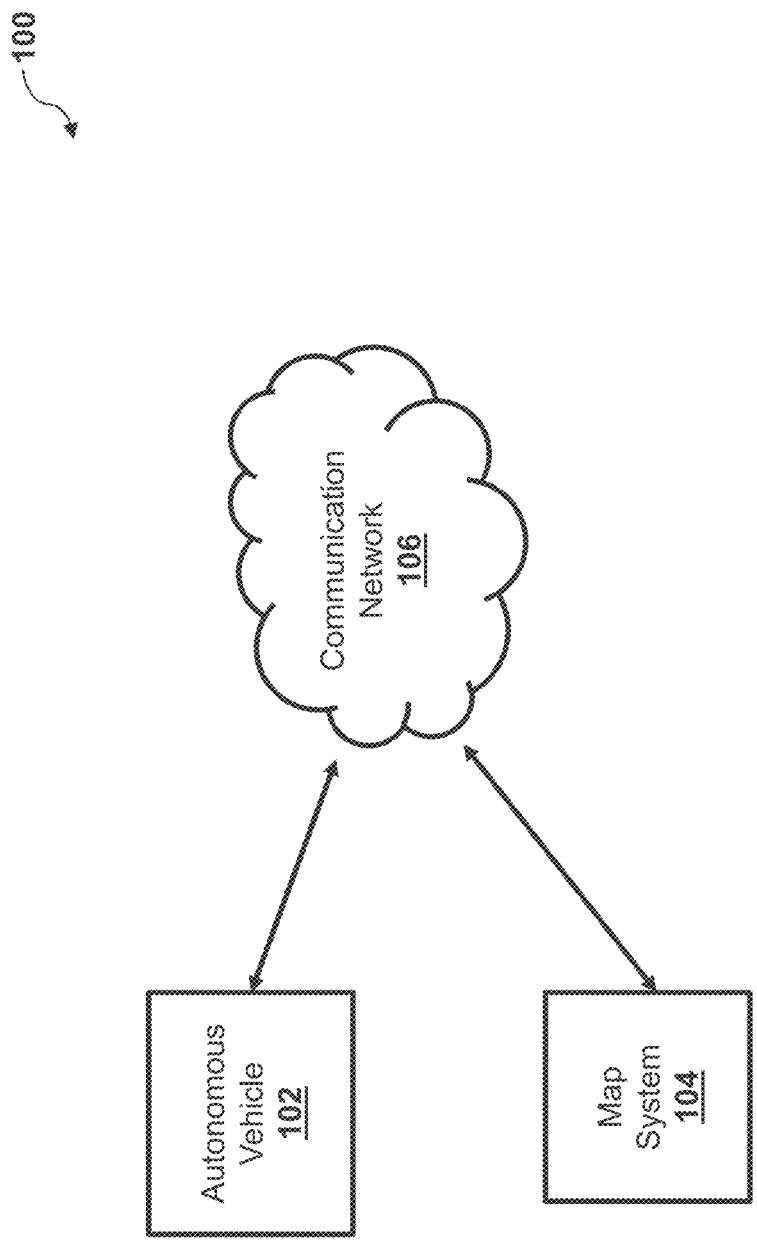
FIG. 1 is a diagram of non-limiting embodiments or aspects of an environment in which systems, methods, products, apparatuses, and/or devices, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. A computing device may also be a desktop computer or other form of non-mobile computer.

As used herein, the term "server" and/or "processor" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "user interface" or "graphical user interface" may refer to a generated display, such as one or more graphical user interfaces (GUIs) with which a user may interact, either directly or indirectly (e.g., through a keyboard, mouse, touchscreen, etc.).

Wong et al. in the paper titled "Identifying Unknown Instances for Autonomous Driving", arXiv:1910.11296, discloses an open-set instance segmentation algorithm for point clouds which can segment objects from both known and unknown classes. However, the method of Wong et al. lacks a notion of "outliers", which may include objects that a model has not seen in training. Instead of identifying these unseen object as "novel" objects, the method of Wong et al. maps these unknown objects to existing classes, which may provide for less accurate segmentation.

Chalapathy et al. in the paper titled "Deep Learning for Anomaly Detection: A Survey", arXiv:1901.03407, provides an overview of research methods in deep learning-based anomaly detection, but does not disclose to detect outliers in LiDAR point cloud data. This survey includes methods to tackle a severe data imbalance in a dataset with respect to outliers being extremely sparse. For example, oversampling is one such approach to tackle this issue, however, oversampling has been shown to lead to overfitting. As another example, undersampling discards useful data. Augmentation data techniques can lead to unrealistic synthetic data and contamination of feature space. Creating synthetic data is not always possible for under-represented classes. In addition, creation of synthetic data can be very domain specific. Loss function weighting schemes have shown inferior results when training on a heavily skewed dataset. Training schemes have shown to have better performance when dealing with under-represented classes but don't have an interpretable "outlier" score. These training schemes also focus more on over-represented classes than under-represented one(s).

Non-limiting embodiments or aspects of the present disclosure provide for systems, methods, and autonomous vehicles that obtain at least one point cloud; segment points in the at least one point cloud into a plurality of segments; train a neural network by: providing, as input to the neural network, the plurality of segments; receiving, as output from the neural network, for each segment, one or more first output features associated with one of (i) that segment being a known segment clustered in a known cluster of a plurality of known clusters and (ii) that segment being an outlier segment located in an outlier space located outside each known cluster of the plurality of known clusters; and modifying one or more parameters of the neural network according to a first loss function that depends on the one or more first output features associated with each known segment to generate a first trained neural network; train the first trained neural network by: providing, as input to the first trained neural network, each outlier segment; receiving, as output from the first trained neural network, for each outlier segment, one or more second output features associated with that outlier segment; and modifying one or more parameters of the first trained neural network according to a second loss function different than the first loss function to generate a second trained neural network, wherein the second loss function depends on the one or more second output features associated with each outlier segment; and train an extended isolation forest by applying an extended isolation algorithm to (i) the one or more second output features associated with each outlier segment and (ii) the one or more first output features associated with each known segment, wherein the extended isolation forest generates, for each segment of the plurality of segments, an anomaly score.

In this way, non-limiting embodiments or aspects of the present disclosure segment out points that correspond to instances of objects or "things" in a point cloud, such as pedestrians, vehicles, and/or the like, and semantically classify the segments or instances into objects along with an outlier score, which provides for a hybrid approach to point cloud segmentation in which all data is segmented into segments and semantic meaning is provided for each of the segments.

Referring now to FIG. 1, FIG. 1 is a diagram of an example environment 100 in which systems, methods, products, apparatuses, and/or devices described herein, may be implemented. As shown in FIG. 1, environment 100 may include autonomous vehicle 102, map system 104, and/or communication network 106.

Autonomous vehicle 102 may include one or more devices capable of receiving information and/or data from map system 104 via communication network 106 and/or communicating information and/or data to map system 104 via communication network 106. For example, autonomous vehicle 102 may include a computing device, such as a server, a group of servers, and/or other like devices.

Map system 104 may include one or more devices capable of receiving information and/or data from autonomous vehicle 102 via communication network 106 and/or communicating information and/or data to autonomous vehicle 102 via communication network 106. For example, map system 104 may include a computing device, such as a server, a group of servers, and/or other like devices.

Communication network 106 may include one or more wired and/or wireless networks. For example, communication network 106 may include a cellular network (e.g., a long-term evolution (LTE) network, a third generation (3G) network, a fourth generation (4G) network, a fifth generation (5G) network a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and systems shown in FIG. 1 is provided as an example. There may be additional devices and/or systems, fewer devices and/or systems, different devices and/or systems, or differently arranged devices and/or systems than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. For example, autonomous vehicle 102 may incorporate the functionality of map system 104 such that autonomous vehicle 102 can operate without communication to or from map system 104. Additionally, or alternatively, a set of devices and/or systems (e.g., one or more devices or systems) of environment 100 may perform one or more functions described as being performed by another set of devices and/or systems of environment 100.

Figure 2:
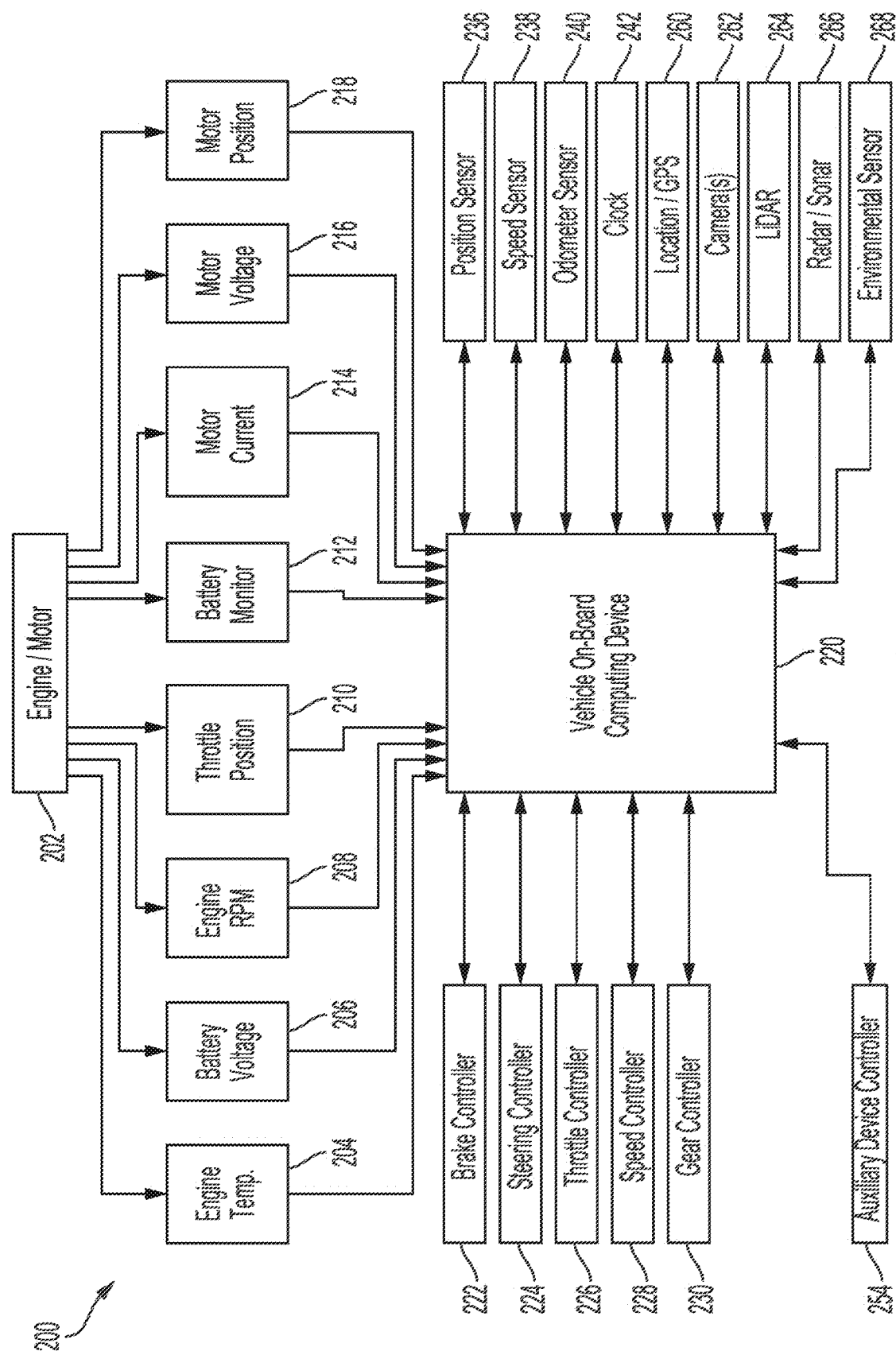
FIG. 2 is an illustration of an illustrative architecture for a vehicle.

Referring now to FIG. 2, FIG. 2 is an illustration of an illustrative system architecture 200 for a vehicle. Autonomous vehicle 102 may include a same or similar system architecture as that of system architecture 200 shown in FIG. 2.

As shown in FIG. 2, system architecture 200 may include engine or motor 202 and various sensors 204-218 for measuring various parameters of the vehicle. In gas-powered or hybrid vehicles having a fuel-powered engine, the sensors may include, for example, engine temperature sensor 204, battery voltage sensor 206, engine Rotations Per Minute ("RPM") sensor 208, and/or throttle position sensor 210. In an electric or hybrid vehicle, the vehicle may have an electric motor, and may have sensors such as battery monitoring sensor 212 (e.g., to measure current, voltage, and/or temperature of the battery), motor current sensor 214, motor voltage sensor 216, and/or motor position sensors 218, such as resolvers and encoders.

System architecture 200 may include operational parameter sensors, which may be common to both types of vehicles, and may include, for example: position sensor 236 such as an accelerometer, gyroscope and/or inertial measurement unit; speed sensor 238; and/or odometer sensor 240. System architecture 200 may include clock 242 that the system 200 uses to determine vehicle time during operation. Clock 242 may be encoded into the vehicle on-board computing device 220, it may be a separate device, or multiple clocks may be available.

System architecture 200 may include various sensors that operate to gather information about an environment in which the vehicle is operating and/or traveling. These sensors may include, for example: location sensor 260 (e.g., a Global Positioning System ("GPS") device); object detection sensors such as one or more cameras 262; LiDAR sensor system 264; and/or radar and/or sonar system 266. The sensors may include environmental sensors 268 such as a precipitation sensor and/or ambient temperature sensor. The object detection sensors may enable the system architecture 200 to detect objects that are within a given distance range of the vehicle in any direction, and the environmental sensors 268 may collect data about environmental conditions within an area of operation and/or travel of the vehicle.

During operation of system architecture 200, information is communicated from the sensors of system architecture 200 to on-board computing device 220. On-board computing device 220 analyzes the data captured by the sensors and optionally controls operations of the vehicle based on results of the analysis. For example, on-board computing device 220 may control: braking via a brake controller 222; direction via steering controller 224; speed and acceleration via throttle controller 226 (e.g., in a gas-powered vehicle) or motor speed controller 228 such as a current level controller (e.g., in an electric vehicle); differential gear controller 230 (e.g., in vehicles with transmissions); and/or other controllers such as auxiliary device controller 254.

Geographic location information may be communicated from location sensor 260 to on-board computing device 220, which may access a map of the environment including map data that corresponds to the location information to determine known fixed features of the environment such as streets, buildings, stop signs and/or stop/go signals. Captured images and/or video from cameras 262 and/or object detection information captured from sensors such as LiDAR 264 is communicated from those sensors to on-board computing device 220. The object detection information and/or captured images are processed by on-board computing device 220 to detect objects in proximity to the vehicle. Any known or to be known technique for making an object detection based on sensor data and/or captured images can be used in the embodiments disclosed in this document.

Figure 3:
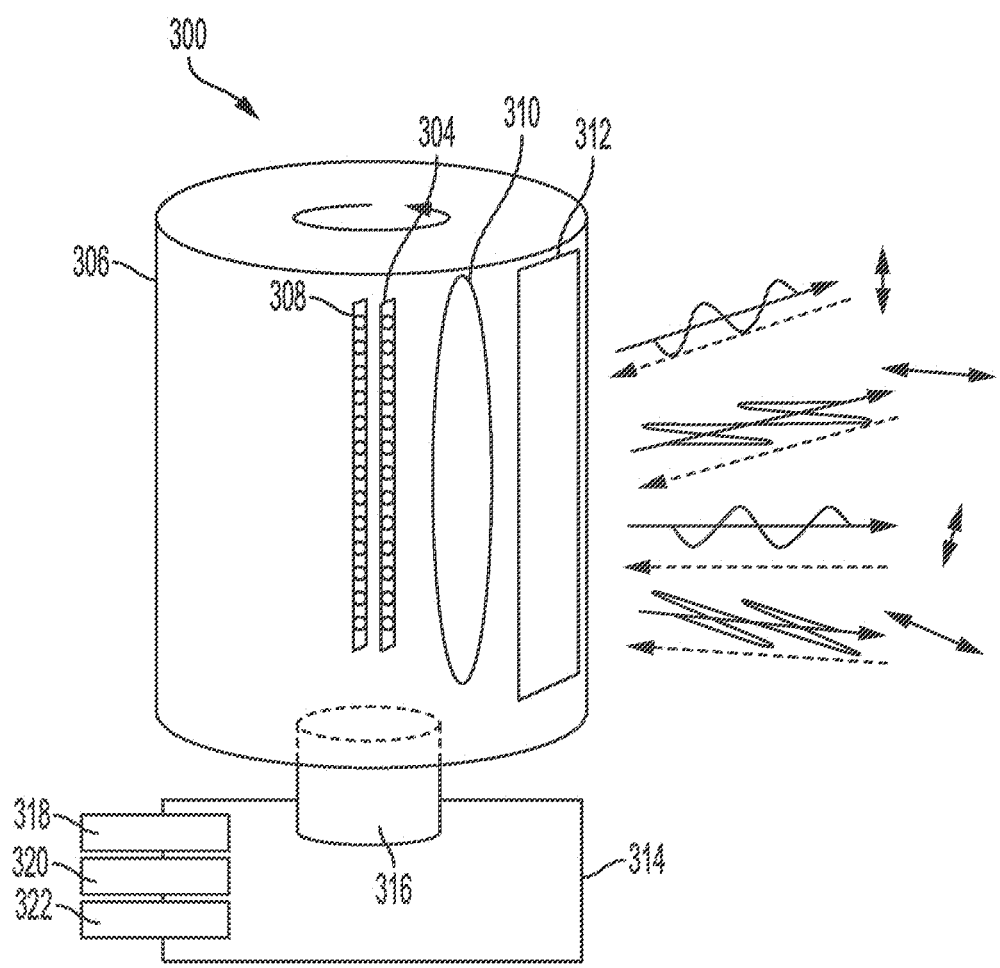
FIG. 3 is an illustration of an illustrative architecture for a LiDAR system.

Referring now to FIG. 3, FIG. 3 is an illustration of an illustrative LiDAR system 300. LiDAR system 264 of FIG. 2 may be the same as or substantially similar to LiDAR system 300.

As shown in FIG. 3, LiDAR system 300 may include housing 306, which may be rotatable 360° about a central axis such as hub or axle 316. Housing 306 may include an emitter/receiver aperture 312 made of a material transparent to light. Although a single aperture is shown in FIG. 3, non-limiting embodiments or aspects of the present disclosure are not limited in this regard. In other scenarios, multiple apertures for emitting and/or receiving light may be provided. Either way, LiDAR system 300 can emit light through one or more of aperture(s) 312 and receive reflected light back toward one or more of aperture(s) 312 as housing 306 rotates around the internal components. In an alternative scenario, the outer shell of housing 306 may be a stationary dome, at least partially made of a material that is transparent to light, with rotatable components inside of housing 306.

Inside the rotating shell or stationary dome is a light emitter system 304 that is configured and positioned to generate and emit pulses of light through aperture 312 or through the transparent dome of housing 306 via one or more laser emitter chips or other light emitting devices. Emitter system 304 may include any number of individual emitters (e.g., 8 emitters, 64 emitters, 128 emitters, etc.). The emitters may emit light of substantially the same intensity or of varying intensities. The individual beams emitted by light emitter system 304 may have a well-defined state of polarization that is not the same across the entire array. As an example, some beams may have vertical polarization and other beams may have horizontal polarization. LiDAR system 300 may include light detector 308 containing a photodetector or array of photodetectors positioned and configured to receive light reflected back into the system. Emitter system 304 and light detector 308 may rotate with the rotating shell, or emitter system 304 and light detector 308 may rotate inside the stationary dome of housing 306. One or more optical element structures 310 may be positioned in front of light emitting unit 304 and/or light detector 308 to serve as one or more lenses and/or waveplates that focus and direct light that is passed through optical element structure 310.

One or more optical element structures 310 may be positioned in front of a mirror to focus and direct light that is passed through optical element structure 310. As described herein below, LiDAR system 300 may include optical element structure 310 positioned in front of a mirror and connected to the rotating elements of LiDAR system 300 so that optical element structure 310 rotates with the mirror. Alternatively or in addition, optical element structure 310 may include multiple such structures (e.g., lenses, waveplates, etc.). In some non-limiting embodiments or aspects, multiple optical element structures 310 may be arranged in an array on or integral with the shell portion of housing 306.

In some non-limiting embodiments or aspects, each optical element structure 310 may include a beam splitter that separates light that the system receives from light that the system generates. The beam splitter may include, for example, a quarter-wave or half-wave waveplate to perform the separation and ensure that received light is directed to the receiver unit rather than to the emitter system (which could occur without such a waveplate as the emitted light and received light should exhibit the same or similar polarizations).

LiDAR system 300 may include power unit 318 to power the light emitting unit 304, motor 316, and electronic components. LiDAR system 300 may include an analyzer 314 with elements such as processor 322 and non-transitory computer-readable memory 320 containing programming instructions that are configured to enable the system to receive data collected by the light detector unit, analyze the data to measure characteristics of the light received, and generate information that a connected system can use to make decisions about operating in an environment from which the data was collected. Analyzer 314 may be integral with the LiDAR system 300 as shown, or some or all of analyzer 314 may be external to LiDAR system 300 and communicatively connected to LiDAR system 300 via a wired and/or wireless communication network or link.

Figure 4:
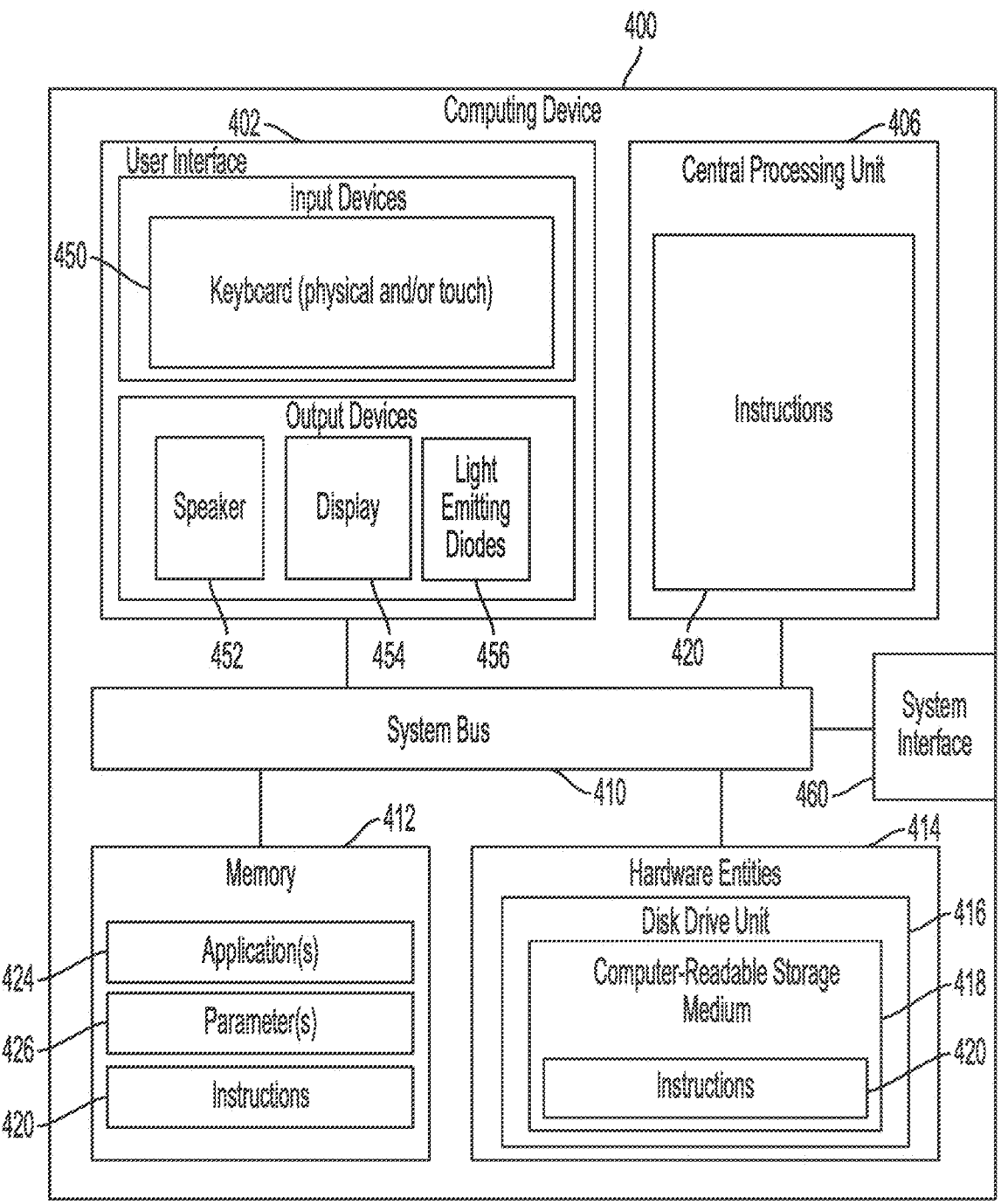
FIG. 4 is an illustration of an illustrative computing device.

Referring now to FIG. 4, FIG. 4 is an illustration of an illustrative architecture for a computing device 400. Computing device 400 can correspond to one or more devices of (e.g., one or more devices of a system of) autonomous vehicle 102 (e.g., one more devices of system architecture 200, etc.) and/or one or more devices of map system 104. In some non-limiting embodiments or aspects, one or more devices of (e.g., one or more devices of a system of) autonomous vehicle 102 (e.g., one or more devices of system architecture 200, etc.) and/or one or more devices of map system 104 can include at least one computing device 400 and/or at least one component of computing device 400.

The number and arrangement of components shown in FIG. 4 are provided as an example. In some non-limiting embodiments or aspects, computing device 400 may include additional components, fewer components, different components, or differently arranged components than those shown in FIG. 4. Additionally, or alternatively, a set of components (e.g., one or more components) of computing device 400 may perform one or more functions described as being performed by another set of components of device 400.

As shown in FIG. 4, computing device 400 comprises user interface 402, Central Processing Unit ("CPU") 406, system bus 410, memory 412 connected to and accessible by other portions of computing device 400 through system bus 410, system interface 460, and hardware entities 414 connected to system bus 410. User interface 402 can include input devices and output devices, which facilitate user-software interactions for controlling operations of the computing device 400. The input devices may include, but are not limited to, physical and/or touch keyboard 450. The input devices can be connected to computing device 400 via a wired and/or wireless connection (e.g., a Bluetooth® connection). The output devices may include, but are not limited to, speaker 452, display 454, and/or light emitting diodes 456. System interface 460 is configured to facilitate wired and/or wireless communications to and from external devices (e.g., network nodes such as access points, etc.).

At least some of hardware entities 414 may perform actions involving access to and use of memory 412, which can be a Random Access Memory ("RAM"), a disk drive, flash memory, a Compact Disc Read Only Memory ("CD-ROM") and/or another hardware device that is capable of storing instructions and data. Hardware entities 414 can include disk drive unit 416 comprising computer-readable storage medium 418 on which is stored one or more sets of instructions 420 (e.g., software code) configured to implement one or more of the methodologies, procedures, or functions described herein. Instructions 420, applications 424, and/or parameters 426 can also reside, completely or at least partially, within memory 412 and/or within CPU 406 during execution and/or use thereof by computing device 400. Memory 412 and CPU 406 may include machine-readable media. The term "machine-readable media", as used here, may refer to a single medium or multiple media (e.g., a centralized or distributed database, and/or associated caches and server) that store the one or more sets of instructions 420. The term "machine readable media", as used here, may refer to any medium that is capable of storing, encoding or carrying a set of instructions 420 for execution by computing device 400 and that cause computing device 400 to perform any one or more of the methodologies of the present disclosure.

Figure 5A:
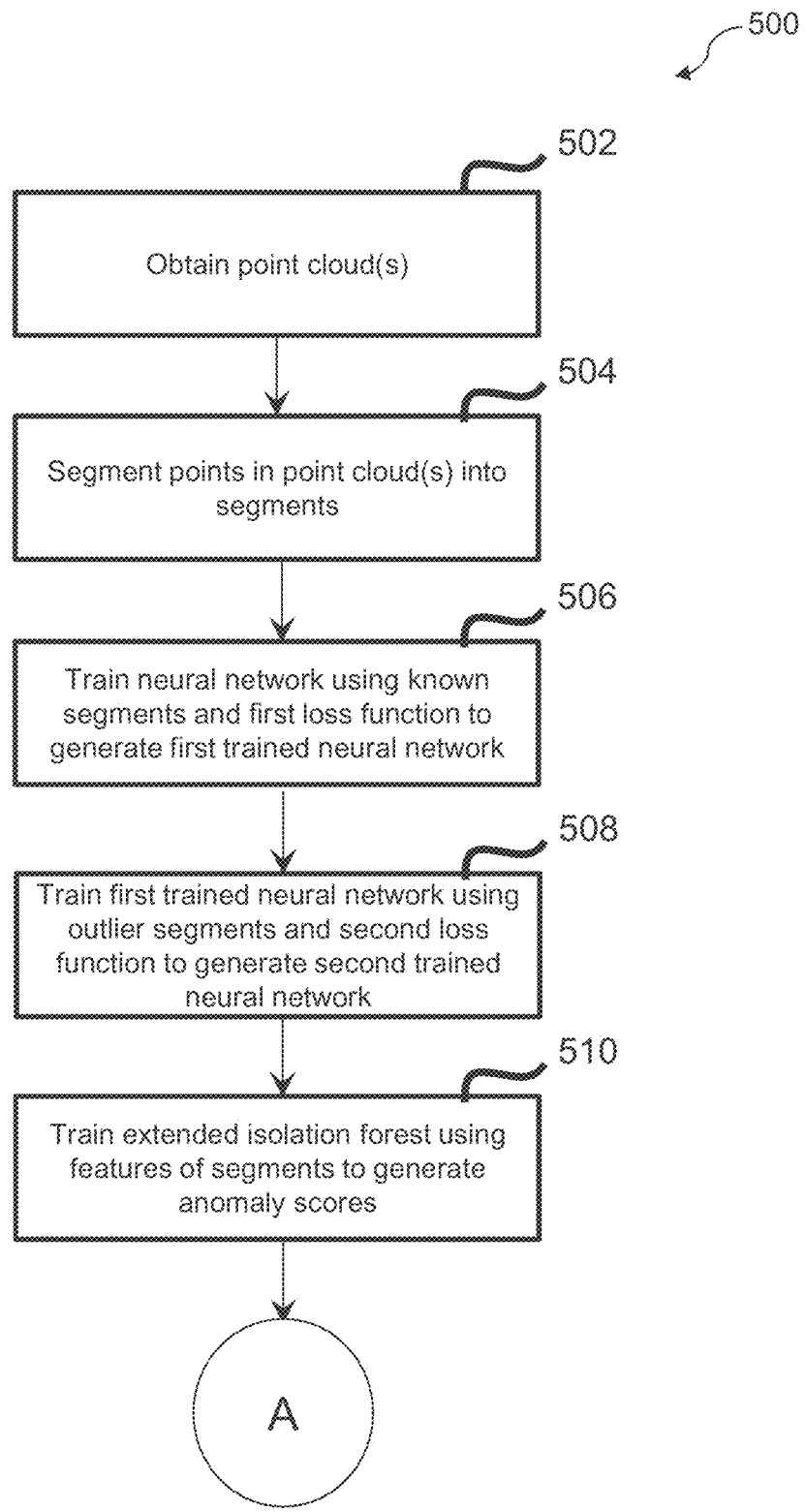
FIGS. 5A and 5B are flowcharts of non-limiting embodiments or aspects of a process for hybrid LiDAR segmentation.
Figure 5B:
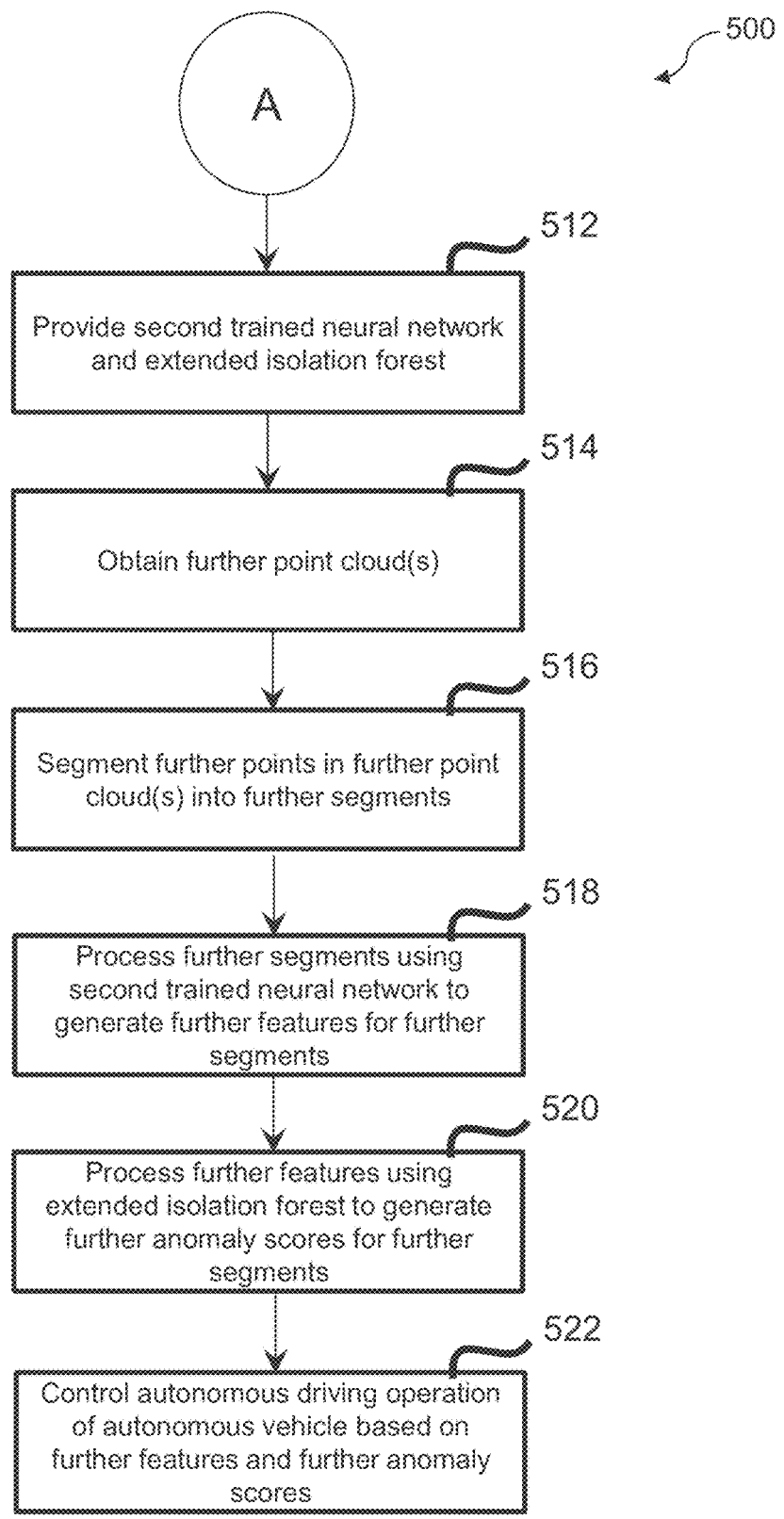

Referring now to FIGS. 5A and 5B, FIGS. 5A and 5B are flowcharts of non-limiting embodiments or aspects of a process 500 for hybrid LiDAR segmentation. In some non-limiting embodiments or aspects, one or more of the steps of process 500 may be performed (e.g., completely, partially, etc.) by autonomous vehicle 102 (e.g., system architecture 200, etc.). In some non-limiting embodiments or aspects, one or more of the steps of process 500 may be performed (e.g., completely, partially, etc.) by another device or a group of devices separate from or including autonomous vehicle 102 (e.g., system architecture 200, etc.), such as map system 104 (e.g., one or more devices of map system 104, etc.).

As shown in FIG. 5A, at step 502, process 500 includes obtaining at least one point cloud. For example, autonomous vehicle 102 (e.g., system architecture 200, etc.) may obtain at least one point cloud associated with an environment surrounding autonomous vehicle 102. As an example, autonomous vehicle 102 (e.g., LiDAR system 300, etc.) may determine sensor data associated with an environment surrounding autonomous vehicle 102, and the sensor data may be associated with at least one point cloud (e.g., a plurality of point clouds captured over a period of time, etc.) of the environment surrounding autonomous vehicle 102. As an example, autonomous vehicle 102 (e.g., LiDAR system 300, etc.) may receive, from map system 104, one or more point clouds associated with one or more environments.

In some non-limiting embodiments or aspects, a point cloud may include a plurality of points associated with a plurality of intensities. In such an example, an amount of data collected (e.g., via LiDAR system 300, etc.) for objects that are closer to autonomous vehicle 102 may be much greater than an amount of data collected for objects that are farther from autonomous vehicle 102. For example, for LiDAR system 300, there may be many more returns in a much denser pattern for objects closer to autonomous vehicle 102.

Figure 8:
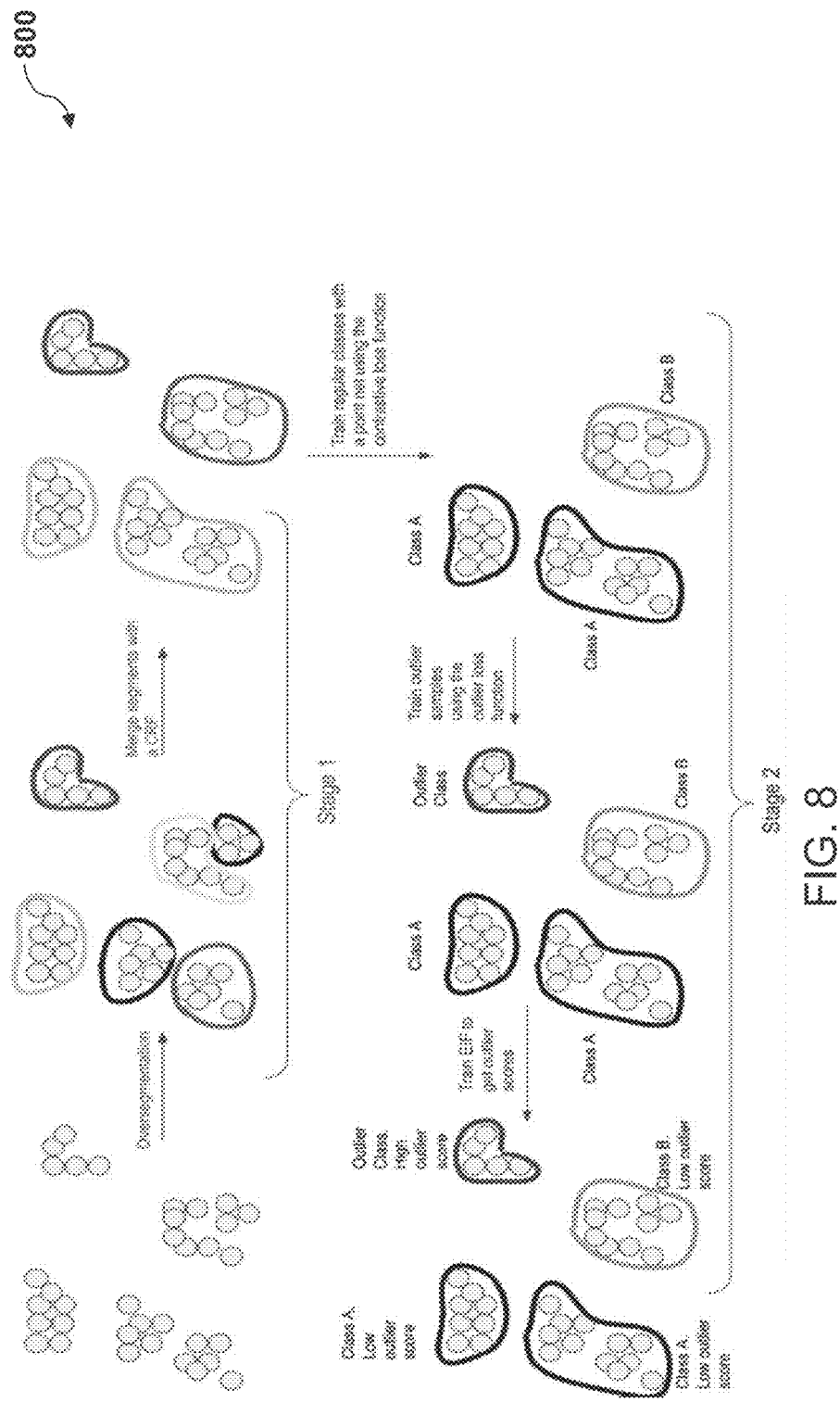
FIG. 8 is an illustration of non-limiting embodiments or aspects of an implementation of a process for hybrid LiDAR segmentation.

As shown in FIG. 5A, at step 504, process 500 includes segmenting points in the at least one point cloud into a plurality of segments. For example, autonomous vehicle 102 (e.g., system architecture 200, etc.) may segment points in the at least one point cloud into a plurality of segments. As an example, autonomous vehicle 102 (e.g., system architecture 200, etc.) may apply one or more segmentation techniques to the at least one point cloud to segment out segments, instances, or clusters of points in the at least one point cloud. In such an example, and referring also to FIG. 8, at Stage 1, an implementation 800 of a process for hybrid LiDAR segmentation may include segmenting out points in the at least one point cloud that correspond to instances of objects or "things", such as pedestrians, vehicles, and/or the like, by using a combination of an oversegmentation algorithm and a conditional random field (CRF). For example, a point cloud may be oversegmented into segments or clusters of points, and these segments or clusters of points maybe merged to group points belonging to each instance.

In some non-limiting embodiments or aspects, autonomous vehicle 102 (e.g., system architecture 200, etc.) may use a combination of local variation segmentation (LVS) and a CRF to segment out segments, instances, or clusters of points in the at least one point cloud. LVS may consider local context to perform initial clustering and a CRF may take global context into account, which enables making segmentation computationally tractable for a global contextual algorithm. In contrast, a more naive approach may construct a graph over an entire point cloud with each point as a node, which is not feasible given that there are typically about 100,000 points in a single scene of LiDAR data, and performing inference on such a large number of nodes is computationally intractable.

LVS is a greedy oversegmentation algorithm that may operate on color differences between neighboring pixels. LVS splits an image into patches such that the variation between neighboring patches is greater than the variation within each patch. The criteria for determining similarity between two patches may be image variation. The primary criteria for variation may be intensity difference in images. Non-limiting embodiments or aspects of the present disclosure may instead use LVS to perform oversegmentation of a point cloud as described in further detail herein below.

In some non-limiting embodiments or aspects, autonomous vehicle 102 (e.g., system architecture 200, etc.) may use a segmentation algorithm as described by P. F. Felzenszwalb, et al. in the paper titled "Image Segmentation using Location Variation", 2003, IEEE Transactions on Image Processing (Volume: 12, Issue: 11, November 2003) pages 1404-1415, the entire contents of which is incorporated by reference, and/or a conditional random field to segment out segments, instances, or clusters of points in the at least one point cloud.

LVS provides oversegmented segments or clusters considering local neighbors, which may be merged using a CRF that takes into account the entire scene or point cloud. Referring again to FIG. 8, through oversegmentation, points corresponding to a single instance may be overestimated, giving multiple segments or clusters that are similar for a single object instance. The overestimated clusters may be merged for each instance with a CRF, with points corresponding to each object instance being segmented out. Multiple variation factors may be considered to calculate variation among neighboring segments or clusters and within a segment or cluster to suit LVS for point cloud applications, such as distance, surface normal difference, LiDAR intensity difference, and/or the like. For example, the variation may be computed as a weighted average of distance, surface normal difference, or LiDAR intensity difference.

Figure 9:
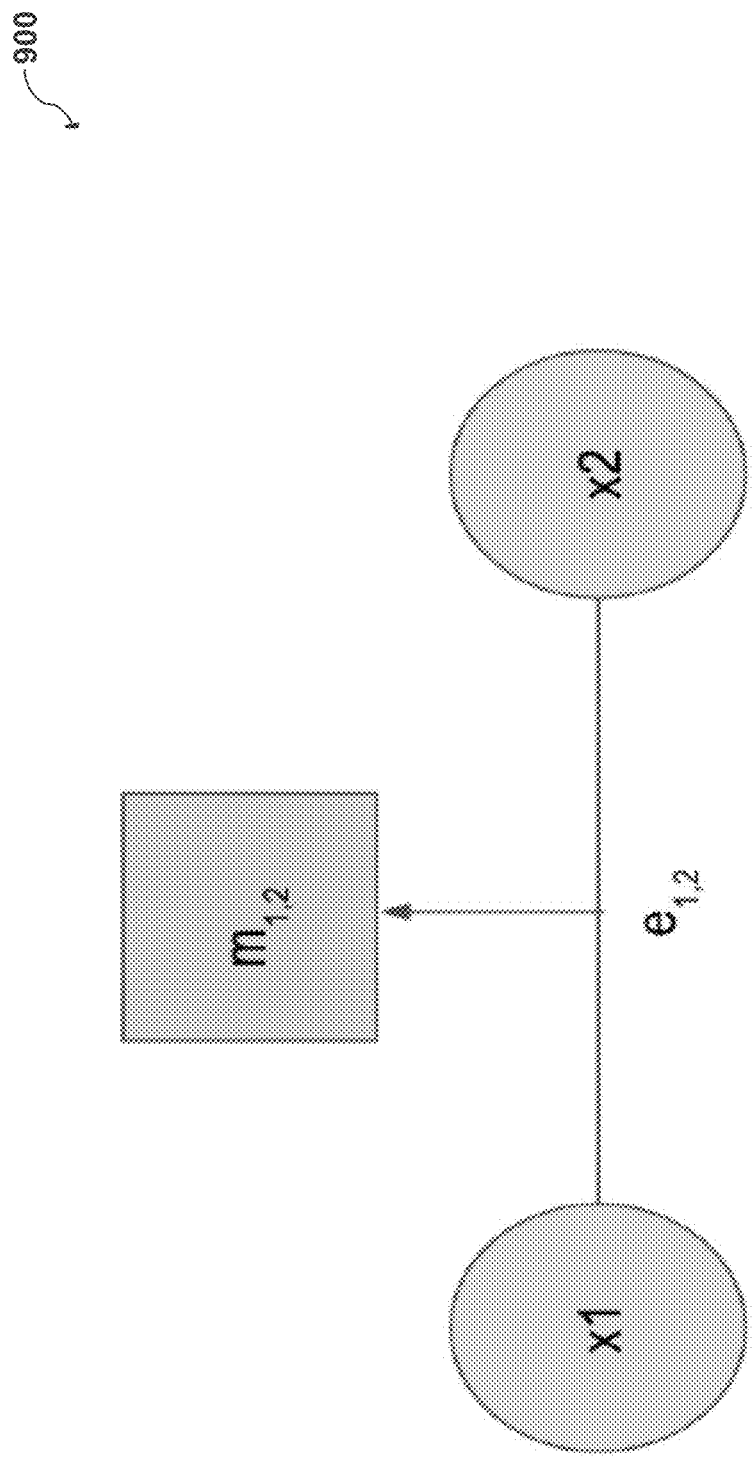
FIG. 9 is an illustration of non-limiting embodiments or aspects of an implementation of a field structure for predicting if two segments should be merged.

A CRF provides a global context that performs in real time and is interpretable for merging segments output from LVS. Referring also to FIG. 9, FIG. 9 an implementation 900 of a field structure for predicting if two segments x1, x2 should be merged and may be formulated as a classification of a merge label $m_{1,2}$ on an edge $e_{1,2}$ connecting the two segments x1, x2. The merge unary potential may lie on the edge between the two segments. For example, the edge potential may be computed as a weighted difference between features of each segment.

As shown in FIG. 5A, at step 506, process 500 includes training a neural network using known segments and a first loss function to generate a first trained neural network. For example, autonomous vehicle 102 (e.g., system architecture 200, etc.) may train a neural network using known segments and a first loss function to generate a first trained neural network. As an example, autonomous vehicle 102 (e.g., system architecture 200, etc.) may provide, as input to the neural network, the plurality of segments; receive, as output from the neural network, for each segment, one or more first output features associated with one of (i) that segment being a known segment clustered in a known cluster or class of a plurality of known clusters or classes and (ii) that segment being an outlier segment located in an outlier space located outside each known cluster or class of the plurality of known clusters or classes; and modify one or more parameters of the neural network according to a first loss function that depends on the one or more first output features associated with each known segment to generate a first trained neural network. In such an example, and referring again to FIG. 8, at Stage 2, the implementation 800 of a process for hybrid LiDAR segmentation may include, after obtaining the segment or group of points corresponding to each instance in a point cloud in Stage 1, using a neural network model (e.g., a PointNet, etc.) to obtain features for each instance in the point cloud.

A known or regular cluster or class may include clusters or classes that have a considerable number (e.g., a threshold number, etc.) of samples, such as a pedestrian class, a vehicle class, and/or the like. An outlier space may be associated with instances for which a considerable number (e.g., a threshold number, etc.) of samples is not available, such as steam, exhaust, and/or the like captured in a point cloud.

In some non-limiting embodiments or aspects, a neural network may include a PointNet as described by Qi et al. in the paper titled "PointNet: Deep Learning on Point Sets for 3D Classification and Segmentation", arXiv:1612.00593, the entire contents of which are incorporated by reference. For example, autonomous vehicle 102 (e.g., system architecture 200, etc.) may use a PointNet with shared weights among all instances in a scene to obtain a semantic class for each segment (e.g., to classify each cluster of points output from Stage 1 in FIG. 8 to a specific class and to regress a degree of certainty, etc.). Features may be extracted from the penultimate layer of the PointNet model. Deep learning algorithms, such as PointNet, already output a probability score with a classification. However, these deep learning algorithms are known to perform poorly on long tail classes. In addition, the probability score is not interpretable, which makes debugging edge cases difficult. Non-limiting embodiments or aspects of the present disclosure instead use the power of deep learning by extracting features for each instance and an extended isolation forest trained on these features to regress an outlier or anomaly score. An extended isolation forest is not as susceptible to the long tail problem that deep learning poses.

Figure 6:
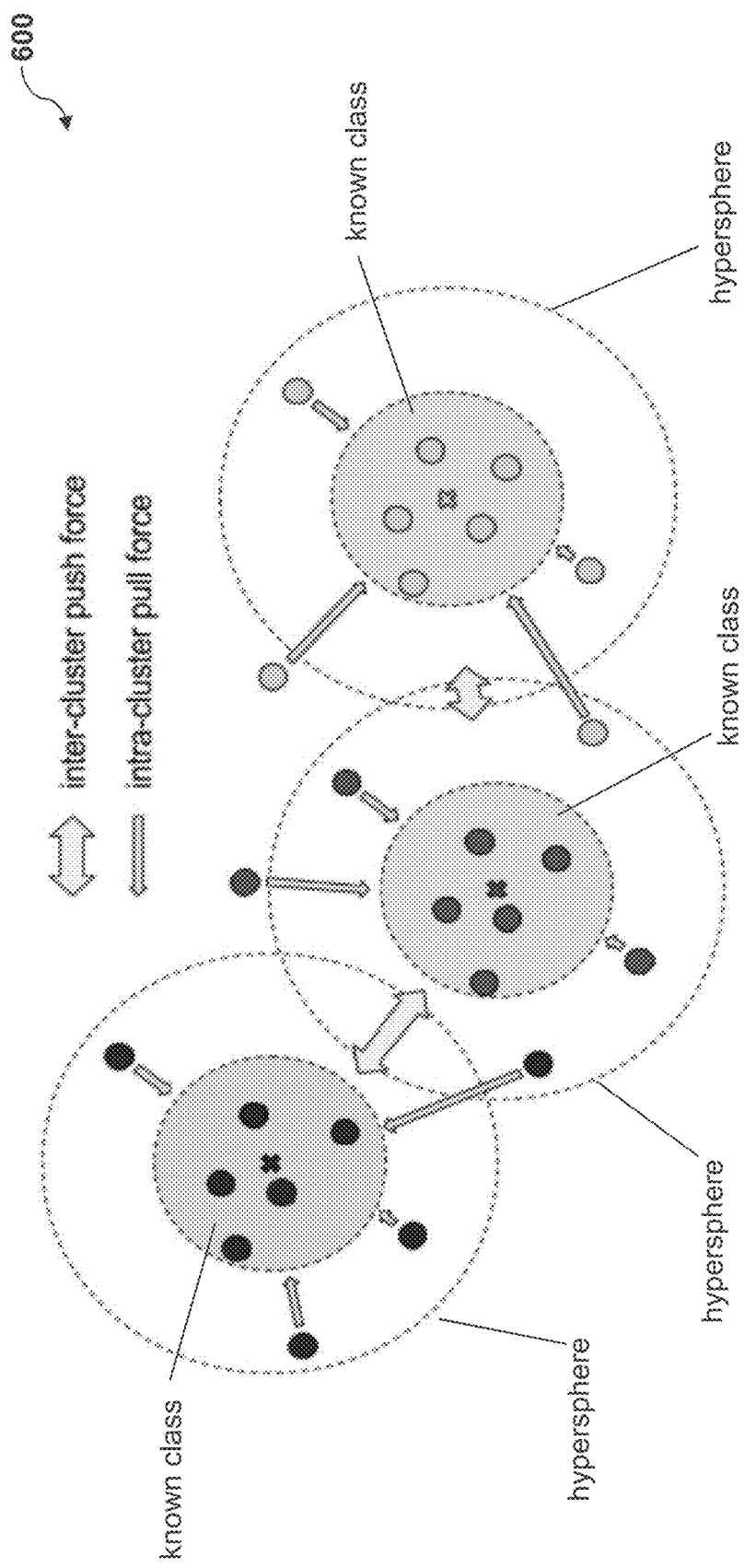
FIG. 6 is an illustration of non-limiting embodiments or aspects of an implementation of a discriminative loss function.

In some non-limiting embodiments or aspects, and referring also to FIG. 6, an implementation 600 of the first loss function may include a discriminative loss function as disclosed by De Brabandere et al. in the paper titled "Semantic Instance Segmentation with a Discriminative Loss Function", arXiv:1708.02551, the entire contents of which is incorporated by reference. For example, autonomous vehicle 102 (e.g., system architecture 200, etc.) may train the PointNet or multilayer perceptron (MLP) network on the known segments with the discriminative loss function as described by De Brabandere et al., which forces the network to create separate isolation pools for each known or regular cluster or class in the embedding space, as well as assists isolation forests to have shallow trees which promotes known or regular clusters or classes to be predicted as outliers with low confidence.

As shown in FIG. 5A, at step 508, process 500 includes training the first trained neural network using outlier segments and a second loss function to generate a second trained neural network. For example, autonomous vehicle 102 (e.g., system architecture 200, etc.) may train the first trained neural network using outlier segments and a second loss function to generate a second trained neural network. As an example, autonomous vehicle 102 (e.g., system architecture 200, etc.) may provide, as input to the first trained neural network, each outlier segment; receive, as output from the first trained neural network, for each outlier segment, one or more second output features associated with that outlier segment; and modify one or more parameters of the first trained neural network according to a second loss function different than the first loss function to generate a second trained neural network, the second loss function depending on the one or more second output features associated with each outlier segment. In such an example, and referring again to FIG. 8, at Stage 2, the implementation 800 of a process for hybrid LiDAR segmentation may further include training the first trained neural network using outlier segments and a second loss function to generate a second trained neural network.

Figure 7:
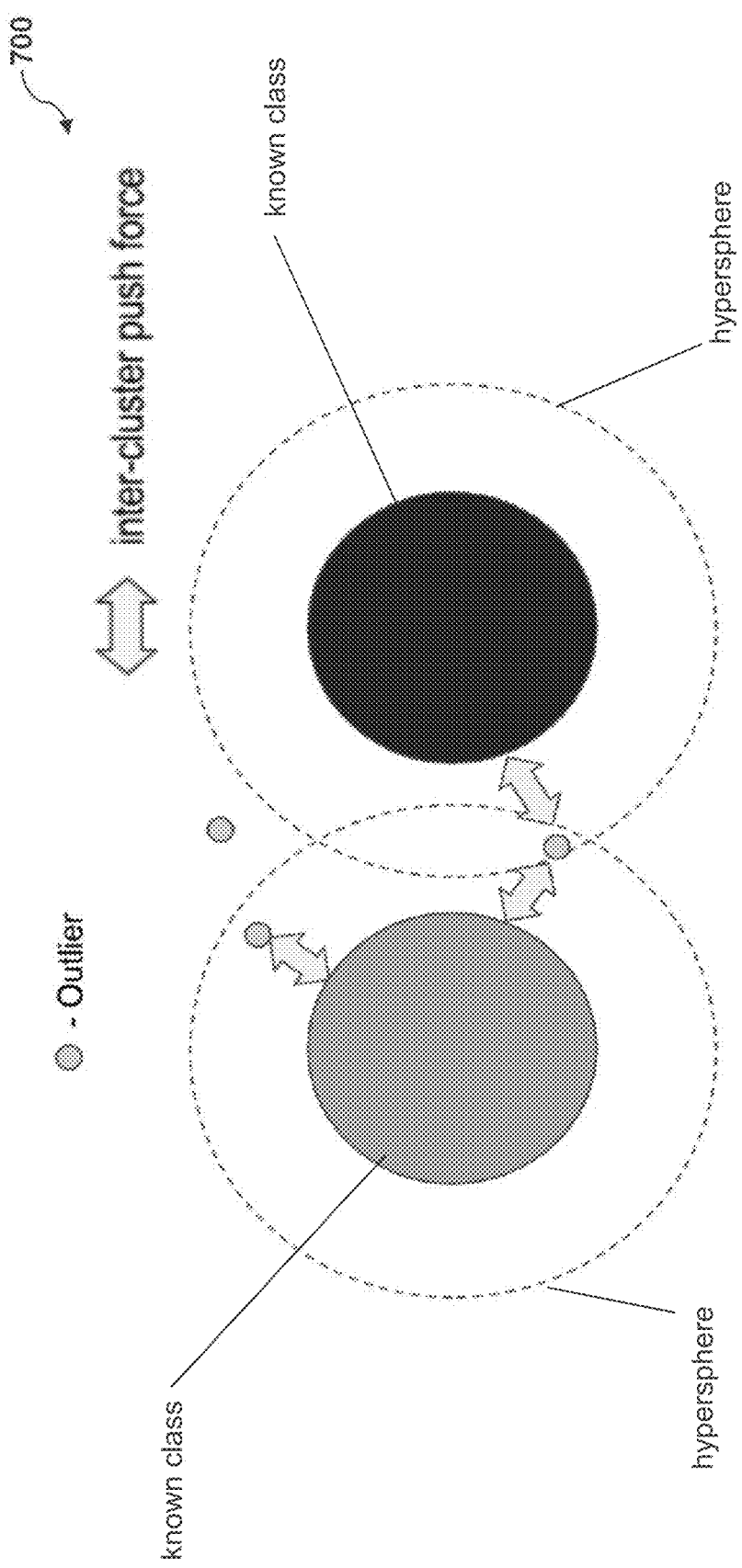
FIG. 7 is an illustration of non-limiting embodiments or aspects of an implementation of a modified discriminative loss function.

In some non-limiting embodiments or aspects, and referring also to FIG. 7, the second loss function is defined according to the following Equation (1):

$$L_{outlier} = \frac{1}{N_o \times C} \sum_{o \in O} \sum_{c \in C} [\delta_o - \|f_o - u_c\|]_+^2 \quad (1)$$

where $N_o$ is a number of the outlier segments, C is a number of the plurality of clusters, $\delta_o$ is a hinge distance, $f_o$ is the one or more second output features associated the outlier segment, and $u_c$ is a mean embedding for a cluster c. A hinge hypersphere radius may be a hyperparameter that can be tuned on a well curated dataset.

Outliers may have arbitrary geometries, intensities, and/or features in LiDAR space. Optimizing to push features towards a mean hinders the generalization capabilities of the network. Instead, as illustrated by an implementation 700 of the second loss function as shown in FIG. 7, the second loss function may fine tune the network by forcing each outlier example to be as far away from each of the known or regular clusters or classes, if within a hypersphere of a known or regular cluster or class. In this way, the second loss function may force the network to not associate similar features with the outliers as with the other classes and develop an intuition of "spreading" out in the embedding space as illustrated in FIG. 7, which provides for deeper isolation trees and higher outlier scores for outliers. The second loss function may also be hinged and/or may not affect outliers that are not in a hypersphere of a known or regular cluster or class. In such an example, autonomous vehicle 102 (e.g., system architecture 200, etc.) may track the performance of the known or regular classes and perform gradient steps if the metrics fail to satisfy a threshold.

Accordingly, non-limiting embodiments or aspects of the present disclosure provide a training scheme and loss function to handle an extreme imbalance between outlier examples and regular classes.

As shown in FIG. 5A, at step 510, process 500 includes training an extended isolation forest. For example, autonomous vehicle 102 (e.g., system architecture 200, etc.) may train an extended isolation forest. As an example, autonomous vehicle 102 (e.g., system architecture 200, etc.) may train an extended isolation forest by applying an extended isolation algorithm to (i) the one or more second output features associated with each outlier segment and (ii) the one or more first output features associated with each known segment. In such an example, and referring again to FIG. 8, at Stage 2, the implementation 800 of a process for hybrid LiDAR segmentation may further include training an extended isolation forest by applying an extended isolation algorithm to (i) the one or more second output features associated with each outlier segment and (ii) the one or more first output features associated with each known segment. For example, the extended isolation forest may generate, for each segment of the plurality of segments (e.g., for each known segment, for each outlier segment, etc.), an anomaly score. In such an example, the extended isolation forest may take in as prior an expected proportion of outliers, which is a hyperparameter that may be tuned to be representative of conditions in which an autonomous vehicle operates. For example, LiDAR point clouds typically have a higher proportion of outliers in snowy weather because of LiDAR returns from vehicle exhaust, and/or the like.

An extended isolation forest is an extension of an isolation forest, which is described by Liu et al. in the paper titled "Isolation Forest", in Proc. 8th IEEE Int. Conf. Data Mining, December 2008, pp. 413-422, the entire contents of which is hereby incorporated by reference. In an isolation forest, data is sub-sampled, and processed in a tree structure based on random cuts in the values of randomly selected features in the dataset. Deeper tree branches correspond to samples being less likely to be anomalous, while shorter tree branches indicate anomaly. However, isolation forests suffer from bias from the way trees are branched that leads to suboptimal anomaly scores. An extended isolation forest addresses this issue by adding a "slope" to the branch cut rather than just a horizontal and vertical as in an isolation forest, which reduce the bias to output more coherent outlier scores. In some non-limiting embodiments or aspects, an extended isolation forest may include an extended isolation forest as described by Hariri et al. in the paper titled "Extended Isolation Forest", arXiv:1811.02141, the entire contents of which is incorporated by reference.

As shown in FIG. 5B, at step 512, process 500 includes providing the second trained neural network and the extended isolation forest. For example, autonomous vehicle 102 (e.g., system architecture 200, etc.) provides the second trained neural network and the extended isolation forest. As an example, map system 104 may perform steps 502-512 of process 500 to generate and provide the second trained neural network and the extended isolation forest to autonomous vehicle 102 via communication network 106.

As shown in FIG. 5B, at step 514, process 500 includes obtaining at least one further point cloud. For example, autonomous vehicle 102 (e.g., system architecture 200, etc.) may obtain at least one point cloud associated with an environment surrounding autonomous vehicle 102. As an example, autonomous vehicle 102 (e.g., LiDAR system 300, camera 262, etc.) may determine sensor data associated with an environment surrounding autonomous vehicle 102, and the sensor data may be associated with at least one point cloud (e.g., a plurality of point clouds captured over a period of time, etc.) of the environment surrounding autonomous vehicle 102.

As shown in FIG. 5B, at step 516, process 500 includes segmenting points in the at least one further point cloud into one or more further segments. For example, autonomous vehicle 102 (e.g., system architecture 200, etc.) may segment points in the at least one point cloud into one or more further segments. As an example, autonomous vehicle 102 (e.g., system architecture 200, etc.) may apply one or more segmentation techniques as described herein to the at least one further point cloud to segment out further segments, instances, or clusters of points in the at least one further point cloud.

As shown in FIG. 5B, at step 518, process 500 includes processing, using the second trained neural network, the one or more further segments to generate one or more further features associated with that further segment. For example, autonomous vehicle 102 (e.g., system architecture 200, etc.) may process, using the second trained neural network, the one or more further segments to generate one or more further features associated with that further segment. As an example, autonomous vehicle 102 (e.g., system architecture 200, etc.) may provide, as input to the second trained neural network, the one or more further segments; receive, as output from the second trained neural network, for each further segment, one or more further output features associated with that further segment (e.g., a class of the plurality of classes in which the further cluster is classified, etc.).

As shown in FIG. 5B, at step 520, process 500 includes processing, using the extended isolation forest, the one or more further features to generate one or more further anomaly scores for the one or more further segments. For example, autonomous vehicle 102 (e.g., system architecture 200, etc.) may process, using the extended isolation forest, the one or more further features to generate one or more further anomaly scores for the one or more further segments.

As shown in FIG. 5B, at step 522, process 500 includes controlling, based on the one or more further features and the one or more further anomaly scores for the one or more further segments, at least one autonomous driving operation of an autonomous vehicle. For example, autonomous vehicle 102 (e.g., system architecture 200, etc.) may control, based on the one or more further features and the one or more further anomaly scores for the one or more further segments, at least one autonomous driving operation of autonomous vehicle 102 (e.g., control autonomous vehicle 102 to slow down, speed up, or bias lateral positioning within a lane or roadway, etc.). In this way, autonomous vehicle 102 (e.g., system architecture 200, etc.) may treat segments with lower anomaly or outlier scores more confidently as members of the cluster or class in which they are clustered or classified and/or segments with higher anomaly or outlier scores less confidently as members of the cluster or class in which they are clustered or classified when performing motion planning and/or control of autonomous vehicle 102.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method, comprising:
   obtaining, with at least one processor, at least one point cloud;
   segmenting, with the at least one processor, points in the at least one point cloud into a plurality of segments;
   training, with the at least one processor, a neural network by:
      providing, as input to the neural network, the plurality of segments;
      receiving, as output from the neural network, for each segment, one or more first output features associated with one of (i) that segment being a known segment clustered in a known cluster of a plurality of known clusters and (ii) that segment being an outlier segment located in an outlier space located outside each known cluster of the plurality of known clusters; and
      modifying one or more parameters of the neural network according to a first loss function that depends on the one or more first output features associated with each known segment to generate a first trained neural network;
   training, with the at least one processor, the first trained neural network by:
      providing, as input to the first trained neural network, each outlier segment;
      receiving, as output from the first trained neural network, for each outlier segment, one or more second output features associated with that outlier segment; and
      modifying one or more parameters of the first trained neural network according to a second loss function different than the first loss function to generate a second trained neural network, wherein the second loss function depends on the one or more second output features associated with each outlier segment; and
   training, with the at least one processor, an extended isolation forest by applying an extended isolation algorithm to (i) the one or more second output features associated with each outlier segment and (ii) the one or more first output features associated with each known segment, wherein the extended isolation forest generates, for each segment of the plurality of segments, an anomaly score.

2. The computer-implemented method of claim 1, further comprising using, by the at least one processor, a conditional random field (CRF) to segment the points in the at least one point cloud into the plurality of segments.

3. The computer-implemented method of claim 1, wherein the neural network includes a multilayer perceptron (MLP) network.

4. The computer-implemented method of claim 1, wherein the second loss function is defined according to the following Equation:

$$L_{outlier} = \frac{1}{N_o \times C} \sum_{o \in O} \sum_{c \in C} [\delta_o - \|f_o - u_c\|]_+^2$$

where $N_o$ is a number of the outlier segments, C is a number of the plurality of clusters, $\delta_o$ is a hinge distance, $f_o$ is the one or more second output features associated the outlier segment, and $u_c$ is a mean embedding for a cluster c.

5. The computer-implemented method of claim 1, further comprising:
providing, with the at least one processor, the second trained neural network and the extended isolation forest;
obtaining, with the at least one processor, at least one further point cloud;
segmenting, with the at least one processor, further points in the at least one further point cloud into one or more further segments;
processing, with the at least one processor, using the second trained neural network, the one or more further segments to generate one or more further output features associated with the one or more further segments; and
processing, with the at least one processor, using the extended isolation forest, the one or more further features to generate one or more further anomaly scores for the one or more further segments.

6. The computer-implemented method of claim 5, further comprising:
controlling, with the at least one processor, based on the one or more further features and the one or more further anomaly scores for the one or more further segments, at least one autonomous driving operation of an autonomous vehicle.

7. The computer-implemented method of claim 1, wherein the at least one point cloud is associated with a plurality of laser emitters of a LiDAR system.

8. A computer program product comprising at least one non-transitory computer-readable medium including program instructions that, when executed by at least one processor, cause the at least one processor to:
obtain at least one point cloud;
segment points in the at least one point cloud into a plurality of segments;
train a neural network by:
providing, as input to the neural network, the plurality of segments;
receiving, as output from the neural network, for each segment, one or more first output features associated with one of (i) that segment being a known segment clustered in a known cluster of a plurality of known clusters and (ii) that segment being an outlier segment located in an outlier space located outside each known cluster of the plurality of known clusters; and
modifying one or more parameters of the neural network according to a first loss function that depends on the one or more first output features associated with each known segment to generate a first trained neural network;
train the first trained neural network by:
providing, as input to the first trained neural network, each outlier segment;
receiving, as output from the first trained neural network, for each outlier segment, one or more second output features associated with that outlier segment; and
modifying one or more parameters of the first trained neural network according to a second loss function different than the first loss function to generate a second trained neural network, wherein the second loss function depends on the one or more second output features associated with each outlier segment; and
train an extended isolation forest by applying an extended isolation algorithm to (i) the one or more second output features associated with each outlier segment and (ii) the one or more first output features associated with each known segment, wherein the extended isolation forest generates, for each segment of the plurality of segments, an anomaly score.

9. The computer program product of claim 8, wherein the at least one processor uses a conditional random field (CRF) to segment the points in the at least one point cloud into the plurality of segments.

10. The computer program product of claim 8, wherein the neural network includes a multilayer perceptron (MLP) network.

11. The computer program product of claim 8, wherein the second loss function is defined according to the following Equation:

$$L_{outlier} = \frac{1}{N_o \times C} \sum_{o \in O} \sum_{c \in C} [\delta_o - \|f_o - u_c\|]_+^2$$

where $N_o$ is a number of the outlier segments, C is a number of the plurality of clusters, $\delta_o$ is a hinge distance, $f_o$ is the one or more second output features associated the outlier segment, and $u_c$ is a mean embedding for a cluster c.

12. The computer program product of claim 8, wherein the at least one processor is further configured to:
provide the second trained neural network and the extended isolation forest;
obtain at least one further point cloud;
segment further points in the at least one further point cloud into one or more further segments;
process, using the second trained neural network, the one or more further segments to generate one or more further output features associated with the one or more further segments; and
process, using the extended isolation forest, the one or more further features to generate one or more further anomaly scores for the one or more further segments.

13. The computer program product of claim 12, wherein the at least one processor is further configured to control, based on the one or more further features and the one or more further anomaly scores for the one or more further segments, at least one autonomous driving operation of an autonomous vehicle.

14. The computer program product of claim 8, wherein the at least one point cloud is associated with a plurality of laser emitters of a LiDAR system.

15. A system, comprising:
one or more sensors configured to capture one or more point clouds associated with an environment surrounding an autonomous vehicle;
at least one processor configured to:
store a segmentation neural network trained by:
providing, as input to a neural network, a plurality of segments segmented from at least one point cloud;

receiving, as output from the neural network, for each segment, one or more first output features associated with one of (i) that segment being a known segment clustered in a known cluster of a plurality of known clusters and (ii) that segment being an outlier segment located in an outlier cluster located outside each known cluster of the plurality of known clusters; and modifying one or more parameters of the neural network according to a first loss function that depends on the one or more first output features associated with each known segment to generate a first trained neural network;

providing, as input to the first trained neural network, each outlier segment;

receiving, as output from the first trained neural network, for each outlier segment, one or more second output features associated with that outlier segment; and modifying one or more parameters of the first trained neural network according to a second loss function different than the first loss function to generate the segmentation neural network, wherein the second loss function depends on the one or more second output features associated with each outlier segment;

store an extended isolation forest trained by:
applying an extended isolation algorithm to (i) the one or more second output features associated with each outlier segment and (ii) the one or more first output features associated with each known segment, wherein the extended isolation forest generates, for each segment of the plurality of segments, an anomaly score;

segment further points in the one or more point clouds into one or more further segments;

process, using the segmentation neural network, the one or more further segments to generate one or more further output features associated with the one or more further segments; and process, using the extended isolation forest, the one or more further features to generate one or more further anomaly scores for the one or more further segments.

16. The system of claim 15, wherein the at least one processor is further configured to use a conditional random field (CRF) to segment the further points in the one or more point clouds into the one or more further segments.

17. The system of claim 15, wherein the segmentation neural network includes a multilayer perceptron (MLP) network.

18. The system of claim 15, wherein the second loss function is defined according to the following Equation:

$$L_{outlier} = \frac{1}{N_o \times C} \sum_{o \in O} \sum_{c \in C} [\delta_o - \|f_o - u_c\|]_+^2$$

where $N_o$ is a number of the outlier segments, C is a number of the plurality of clusters, $\delta_o$ is a hinge distance, $f_o$ is the one or more second output features associated the outlier segment, and $u_c$ is a mean embedding for a cluster c.

19. The system of claim 15, wherein the at least one processor is further configured to control, based on the one or more further features and the one or more further anomaly scores for the one or more further segments, at least one autonomous driving operation of the autonomous vehicle.

20. The system of claim 15, wherein the one or more sensors include a LiDAR system.

* * * * *